US012694556B2

(12) United States Patent
Stent et al.

(10) Patent No.: US 12,694,556 B2
(45) Date of Patent: Jul. 28, 2026

(54) SYSTEMS AND METHODS FOR DETECTING OCCLUDED OBJECTS

(71) Applicants:Toyota Research Institute, Inc., Los Altos, CA (US); Columbia University, New York, NY (US)

(72) Inventors: Simon A.I. Stent, Oxford (GB); Ruoshi Liu, New York, NY (US); Sachit Menon, New York, NY (US); Chengzhi Mao, New York, NY (US); Dennis Park, Sunnyvale, CA (US); Carl M. Vondrick, New York, NY (US)

(73) Assignees: Toyota Research Institute, Inc., Los Altos, CA (US); Toyota Jidosha Kabushiki Kaisha, Toyota (JP); Columbia University, New York, NY (US)

( * ) Notice: Subject to any disclaimer, the term of this patent is extended or adjusted under 35 U.S.C. 154(b) by 562 days.

(21) Appl. No.: 18/167,603

(22) Filed: Feb. 10, 2023

(65) Prior Publication Data

US 2023/0298199 A1     Sep. 21, 2023

Related U.S. Application Data

(60) Provisional application No. 63/320,902, filed on Mar. 17, 2022.

(51) Int. Cl.
| | |
|---|---|
| *G06T 7/70* | (2017.01) |
| *B25J 9/02* | (2006.01) |
(Continued)

(52) U.S. Cl.
CPC .................... *G06T 7/70* (2017.01); *B25J 9/02* (2013.01); *G06T 7/50* (2017.01); *G06V 10/26* (2022.01);
(Continued)

(58) Field of Classification Search
CPC ... G06T 7/70; G06T 7/50; G06T 2207/20081; G06T 2207/20084; G06T 7/73;
(Continued)

(56) References Cited

U.S. PATENT DOCUMENTS

| | | |
|---|---|---|
| 9,563,980 B2 | 2/2017 | Cook et al. |
| 10,152,824 B2 | 12/2018 | Holz |
(Continued)

FOREIGN PATENT DOCUMENTS

| | | |
|---|---|---|
| WO | 2009016809 A1 | 2/2009 |
| WO | 2012175703 A1 | 12/2012 |

OTHER PUBLICATIONS

On 3-D surface reconstruction using shape from shadows (https://citeseerx.ist.psu.edu/viewdoc/download?doi=10.1.1.69.7653&rep=rep1&type=pdf), Aug. 6, 2002.

*Primary Examiner* — Andrew W Bee
*Assistant Examiner* — D J Dhooge
(74) *Attorney, Agent, or Firm* — Dinsmore & Shohl LLP

(57) ABSTRACT

Systems and methods for detecting occluded objects are disclosed. In one embodiment, a method of determining a shape and pose of an object occluded by an occlusion object includes receiving, by a generative model, a latent vector, and iteratively performing an optimization routine until a loss is less than a loss threshold. The optimization routine includes generating, by the generative model, a predicted object having a shape and a pose from the latent vector, generating a predicted shadow cast by the predicted object, calculating the loss by comparing the predicted shadow with an observed shadow, and modifying the latent vector when the loss is greater than the loss threshold. The method further includes selecting the predicted object as the object when the loss is less than the loss threshold.

20 Claims, 7 Drawing Sheets

(51) Int. Cl.

| | |
|---|---|
| *G06T 7/50* | (2017.01) |
| *G06V 10/26* | (2022.01) |
| *G06V 10/60* | (2022.01) |
| *G06V 10/74* | (2022.01) |
| *G06V 10/764* | (2022.01) |

(52) U.S. Cl.
CPC ............ *G06V 10/60* (2022.01); *G06V 10/761* (2022.01); *G06V 10/764* (2022.01); *G06T 2207/20081* (2013.01)

(58) Field of Classification Search
CPC ........... G06T 7/507; B25J 9/02; B25J 9/1697; G06V 10/26; G06V 10/60; G06V 10/761; G06V 10/764
See application file for complete search history.

(56) References Cited

U.S. PATENT DOCUMENTS

| | | | |
|---|---|---|---|
| 2019/0258878 A1* | 8/2019 | Koivisto | .............. G06V 10/774 |
| 2019/0350513 A1 | 11/2019 | Carrein et al. | |
| 2019/0387958 A1 | 12/2019 | Kimpe et al. | |
| 2020/0098168 A1* | 3/2020 | Le | ......................... G06T 15/506 |
| 2022/0051471 A1 | 2/2022 | Logothetis et al. | |
| 2022/0414431 A1* | 12/2022 | Zhang | .................... G06N 3/047 |
| 2022/0414974 A1* | 12/2022 | Zakharov | .................. G06T 7/50 |
| 2023/0123658 A1* | 4/2023 | Liu | ...................... G06N 3/0455 |
| | | | 345/629 |
| 2023/0147722 A1* | 5/2023 | Ramirez de Chanlatte | ................. |
| | | | G06N 3/0442 |
| | | | 345/419 |

\* cited by examiner

SYSTEMS AND METHODS FOR DETECTING OCCLUDED OBJECTS

CROSS-REFERENCE TO RELATED APPLICATIONS

The present application claims priority to U.S. Provisional patent application 63/320,902 filed on Mar. 17, 2022 and entitled "Shadows Shed Light on 3D Objects," which is hereby incorporated by reference in its entirety.

BACKGROUND

Reconstructing the three-dimensional (3D) shape of objects is a fundamental challenge in computer vision, with a number of applications in robotics, graphics, and data science. The task aims to estimate a 3D model from one or more camera views. However, objects are often occluded, with the line of sight obstructed either by another object in the scene, or by themselves (self-occlusion). Reconstruction from a single image is an under-constrained problem, and occlusions further reduce the number of constraints.

Accordingly, a need exists for alternative systems and methods for detecting the shape and pose of occluded objects.

SUMMARY

In one embodiment, a method of determining a shape and pose of an object occluded by an occlusion object includes receiving, by a generative model, a latent vector, and iteratively performing an optimization routine until a loss is less than a loss threshold. The optimization routine includes generating, by the generative model, a predicted object having a shape and a pose from the latent vector, generating a predicted shadow cast by the predicted object, calculating the loss by comparing the predicted shadow with an observed shadow, and modifying the latent vector when the loss is greater than the loss threshold. The method further includes selecting the predicted object as the object when the loss is less than the loss threshold.

In another embodiment, a system for determining a shape and pose of an object occluded by an occlusion object includes one or more processors, and a non-transitory, computer-readable medium storing instructions that, when executed by the one or more processors, cause the one or more processors to receive a latent vector and iteratively perform an optimization routine until a loss is less than a loss threshold, the optimization routine. The optimization routine includes generating, by a generative model, a predicted object having a shape and a pose from the latent vector, generating a predicted shadow cast by the predicted object, calculating the loss by comparing the predicted shadow with an observed shadow, and modifying the latent vector when the loss is greater than the loss threshold. The computer-readable instructions further cause the one or more processors to select the predicted object as the object when the loss is less than the loss threshold.

In yet another embodiment, a robot operable to determine a shape and pose of an object occluded by an occlusion object includes one or more processors, and a non-transitory, computer-readable medium storing instructions that, when executed by the one or more processors, cause the one or more processors to receive a latent vector and iteratively perform an optimization routine until a loss is less than a loss threshold, the optimization routine. The optimization routine includes generating, by a generative model, a predicted object having a shape and a pose from the latent vector, generating a predicted shadow cast by the predicted object, calculating the loss by comparing the predicted shadow with an observed shadow, and modifying the latent vector when the loss is greater than the loss threshold. The computer-readable instructions further cause the one or more processors to select the predicted object as the object when the loss is less than the loss threshold, and control a movement of the robot based on the predicted object.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed methods, systems and robots for determining a shape and pose of an object occluded by an occlusion object. For example, a large chair may occlude a smaller object hidden behind the chair. As another example, a parked car may occlude a bicycle. A system, such as a robot or a vehicle, may benefit from having information regarding the occluded object, such as its shape and pose.

Figure 1:
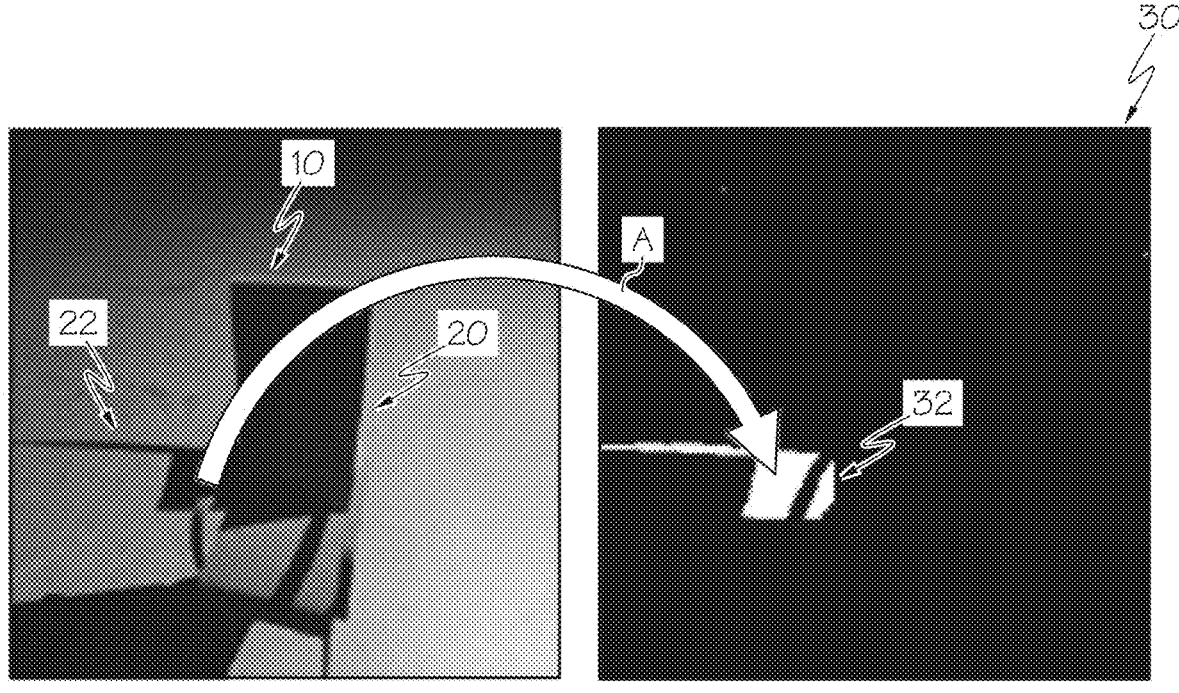
FIG. 1 illustrates digital images of an occluded object hidden behind an occluding object and an observed shadow of the occluded object, according to one or more embodiments described and illustrated herein.

One piece of evidence that humans use to uncover occlusions is the shadow cast on the floor by the hidden object. For example, FIG. 1 shows a scene with an object 20 that has become fully occluded by an occluding object 10, which is a larger chair. Even though no appearance features are visible, the shadow 22 reveals that another, occluded object 20 exists behind the chair, and the silhouette constrains the possible 3D shapes of the occluded object. What hidden object caused that shadow?

Figure 2:
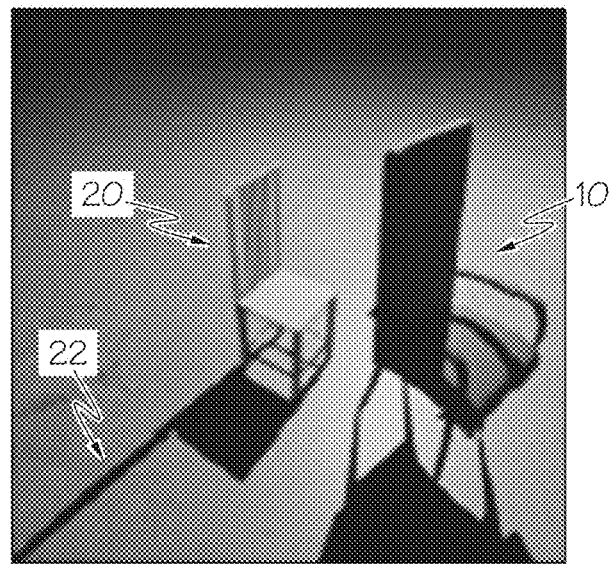
FIG. 2 illustrates a digital image of both the occluded object and the occluding object of FIG. 1 according to one or more embodiments described and illustrated herein.

FIG. 2 illustrates the scene of FIG. 1 from a different perspective. Here, it is revealed that the occluded object 20 is a smaller chair. It may be desirable for a system, such as a robot, to discern the type, shape and pose of the occluded object 20 without having to navigate the environment for a different view.

Figure 3:
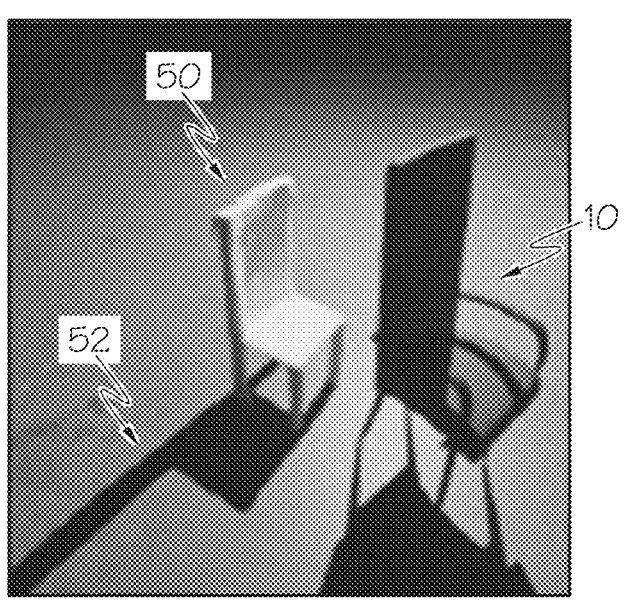
FIG. 3 illustrates a digital image of both a predicted object corresponding to the occluded object of FIGS. 1 and 2 according to one or more embodiments described and illustrated herein.

Embodiments of the present disclosure provide a framework for reconstructing occluded three-dimensional (3D) objects from their shadows. Generally, embodiments include a generative model of objects and their shadows cast by a light source, which is used to jointly infer the 3D shape and the location of the light source. Referring to FIG. 3, a predicted object 50 generated by the framework of the embodiments of the present disclosure to match the occluded object 20 of FIG. 1 casts a predicted shadow 52. A comparison between the actual occluded object 20 shown in FIG. 2 and the predicted occluded object 50 reveals a strong similarity between the two. The model is fully differentiable, which enables the use of gradient descent to efficiently search for the best shapes that explain the observed shadow. The framework integrates both learned empirical priors about the geometry of typical objects and the geometry of cameras in order to estimate realistic 3D volumes that are often encountered in the visual world.

Since the image formation process is modeled, the framework jointly reasons over the object geometry and the parameters of the light source. When the light source is unknown, embodiments may recover multiple different shapes and multiple different positions of the light source that are consistent with each other. When the light source location is known, the framework can make use of that information to further refine its outputs.

Various embodiments for methods for determining a shape and pose of an occluded object, as well as systems, robots, and vehicles that utilize such methods, are described in detail below.

Figure 4:
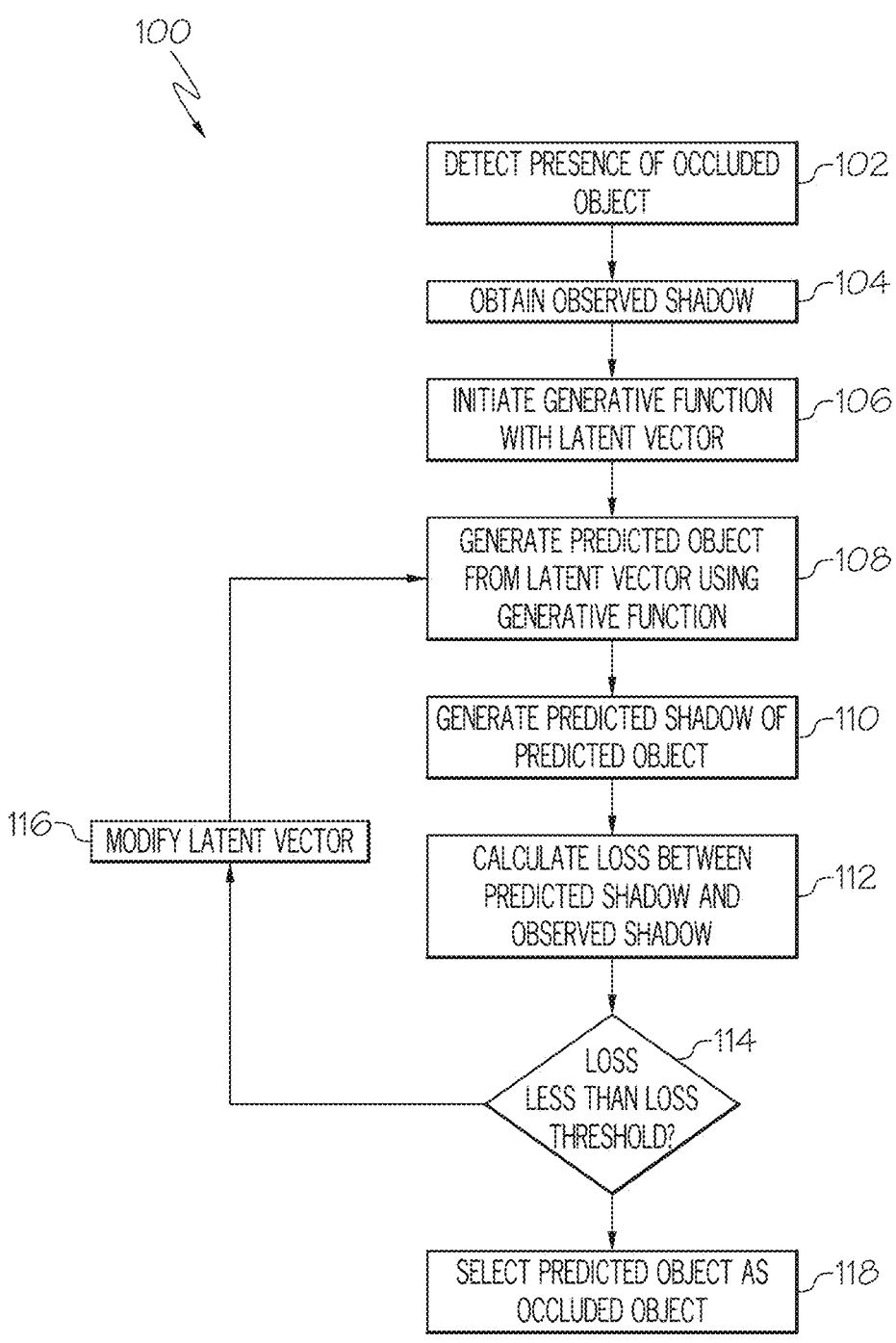
FIG. 4 illustrates a flowchart of an example method for detecting an occluded object according to one or more embodiments described and illustrated herein.
Figure 5:
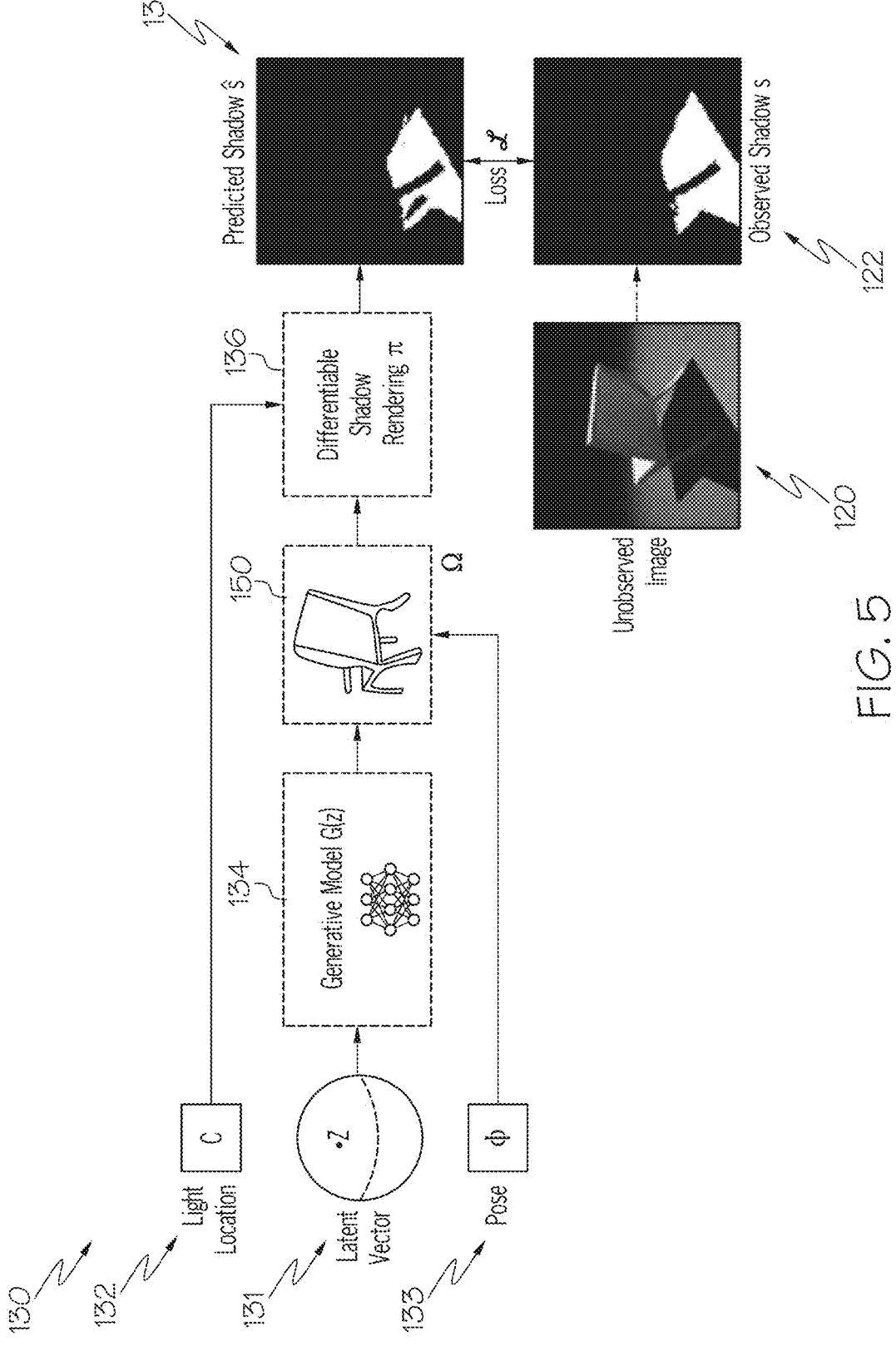
FIG. 5 illustrates an example framework for detecting an occluded object according to one or more embodiments described and illustrated herein.

FIG. 4 illustrates a flowchart 100 depicting an example method for determining a shape and pose of an occluded object that employs an optimization routine. FIG. 5 illustrates an example framework 130 employed by the example method illustrated by FIG. 4. Reference will now be made to both FIGS. 4 and 5 in providing an overview of an example method for determining a shape and pose of an occluded object.

At block 102, the presence of an occluded object is detected. In the example of FIG. 1, the occluded object 20 may be hidden behind an occluding object 10. As a non-limiting example, a robot (e.g., robot 200 illustrated by FIG. 7 and described in detail below) may encounter the occluding object 10 while navigating an environment. The occluded object 20 may be detected by the appearance of a shadow 22 behind the occluding object 10. Any method of detecting the shadow 22 may be used. As a non-limiting example, a model trained on detecting shadows of occluded objects may be employed.

At block 104, the observed shadow 22 is obtained. For example, an image sensor of a robot, vehicle, or other device having the occluded object detection functionalities described herein records an image of the observed shadow 22 to be used as a reference shadow. Next, the method moves to block 106 where a generative model 134 is initiated with at least a latent vector z (131). As a non-limiting example, the latent vector z may be a 128 dimension vector. The generative model 134 may also be initiated with a light location c (132) (or multiple light locations) and a pose $\phi$(133) of the object. One or both of the light location c and the pose $\phi$ may be known a priori. However, in other cases one or both of the light location c and the pose $\phi$ may not be known. These input parameters may be optimized by the framework 130 as described in more detail below.

The method represents the observed shadow 22 as a binary image $s \in \mathbb{R}^{W \times H}$. The goal of the framework 130 is to estimate a set of possible 3D shapes, their poses, and corresponding light sources that are consistent with the shadow s utilizing the generative model 134.

At block 108, the generative model 134 produces a volume representing a candidate predicted object 150. More particularly, Let $\Omega = G(z)$ be a generative model for one or more classes of 3D objects (e.g., chairs) where $\Omega$ parameterizes a 3D volume and $z \sim \mathcal{N}(0,1)$ is a latent vector 131 with an isotropic prior. When the volume blocks light, it will create a shadow. The light location c of an illumination source is provided as $c \in \mathbb{R}^3$ in world coordinates, which radiates light outwards in all directions. An image sensor will observe the shadow $\hat{s} = \pi(c, \Omega)$ (where $\pi$ is a rendering of the shadow cast by the volume $\Omega$ onto the ground plane.

To reconstruct the 3D objects from their shadow, the problem is formulated as finding a latent vector z (131), object pose $\phi$(133), and light source location c (132) such that the predicted shadow $\hat{s}$(138) is consistent with the observed shadow s 22. Inference is performed by solving the optimization problem:

$$\min_{z,c,\phi} \mathcal{L}(s, \pi(c, \Omega)) \text{ where } \Omega = T_\phi(G(z)) \qquad (1)$$

To make the reconstructions realistic, the generative model 134 incorporates priors about the geometry of objects typically observed in the visual world (e.g., chairs, cars, and the like). Rather than searching over the full space of volumes $\Omega$, embodiments of the present disclosure search over the latent space z of the pre-trained deep generative model G(z). Generative models that are trained on large-scale 3D data are able to learn empirical priors about the structure of objects; for example, this can include priors about shape (e.g., automobiles usually have four wheels) and physical stability (e.g., object parts must be supported). As a non-limiting example, the generative model G(z) is trained on the ShapeNet dataset. By operating over the latent space z, the knowledge of the generative model's prior is used to constrain the solutions to 3D objects that match the generative model's output distribution.

Using this implementation, embodiments model 3D volumes with an occupancy field. An occupancy network $y = f_\Omega(x)$ is defined as a neural network that estimates the probability $y \in \mathbb{R}$ that the world coordinates a $x \in \mathbb{R}^3$ contains mass. The generative model G(z) is trained to produce the parameters $\Omega$ of the occupancy network.

Referring once again to FIG. 4, at block 110 a predicted shadow 138 of a candidate predicted object is generated, as also shown at blocks 136 and 138 of the framework shown by FIG. 5. To optimize Equation (1) above with gradient descent, gradients of the shadow rendering $\pi$ and its projection to the camera may be calculated. As a non-limiting example, this operation can be made differentiable by max-pooling the value of the occupancy network along a light ray originating at the light source. Let $x \in \mathbb{R}^3$ be a unit vector at an angle $\theta$, and let $n \in \mathbb{R}^3$ be a vector normal to the ground plane. The method calculates whether the ray from the light source c (132) along the direction of $r_\theta$ will intersect with the ground plane n, or whether it will be blocked by the object $\Omega$. The shadow will be an image $\pi(c, \Omega)$ formed on the ground plane, and the intensity on the plane at position p is given by:

$$\pi(c, \Omega)[p] = \max_{d \in R} f_\Omega(c + dr_\theta) \text{ s.t. } p = c - \frac{c^T n}{r_s^T n} r_\theta \quad (2)$$

For the light ray $r_\theta$ landing at p on the ground plane, the result of $\pi$ is the maximum occupancy value $f_\Omega$ along that ray. Since $\pi(c, \Omega)$ is an image of the shadow on a plane, it is a homography may be used to transform $\pi(c, \Omega)$ into the perspective image and image of the predicted shadow ŝ of the candidate predicted object 150 captured by the camera view.

At block 112, a loss function compares the candidate predicted shadow ŝ 138=$\pi(c, \Omega)$ and the observed shadow s, and since silhouettes are binary images, the loss $\mathscr{L}$ may be calculated as a binary cross-entropy loss. At block 114, the loss $\mathscr{L}$ is compared to a loss threshold. When the loss $\mathscr{L}$ is less than the loss threshold, the process moves to block 118 where the candidate predicted object is selected as the occluded object. When the loss $\mathscr{L}$ is greater than the loss threshold, at least the latent vector is modified at block 116. Embodiments are not limited to any particular loss threshold.

Thus, the method employs an optimization problem. Given a shadow s, the method optimizes z, c, and $\phi$ in Equation 1 with gradient descent while holding the generative model G(z) fixed. As stated above, in some cases, c and $\phi$ are known and fixed, and thus not optimized. The method randomly initializes z by sampling from a multivariate normal distribution, and both a light source location c and an initial pose $\phi$ are randomly sampled when they are being optimized. Gradients are calculated using back-propagation to minimize the loss between the predicted shadow ŝ and the observed shadow s.

When the location of the illumination source is unknown, a 3D coordinate c is sampled from the surface of the northern hemisphere above the ground plane p with a fixed radius (e.g., 3).

When the transformation for the object pose is unknown, the object pose is modeled with an SE(3) transformation $\mathcal{T}$ parameterized by quaternions $\phi$. In other words, the method attempts to find a latent vector that corresponds to an appropriate 3D model of the object that, in the appropriate pose, casts a shadow matching the observed shadow. More particularly, 4-dimensional quaternion $\phi$ is sampled to parameterize the rotation matrix. A non-zero rotation for "pitch" and "yaw" are physically implausible given a level ground plane, so they are constrained to be zero during optimization. To optimize the full model, spherical gradient descent is used to optimize z (and optionally c and $\phi$ if unknown) for up to maximum number of steps (e.g., 300 steps). As a non-limiting example, a step size of 1.0 for known light and pose experiments and 0.01 for unknown light and pose experiments may be used. To accomplish the differentiable shadow rendering $\pi$, 128 points along each light ray emitted from the illumination source may be sampled, then evaluated for occupancy. In the case of occlusion from other objects as well as self-occlusion, the segmentation mask of all objects in the scene may be calculated, and gradients coming from light rays intersecting with these masks may be disabled.

During optimization, the method enforces that latent vector z resembles a sample from a Gaussian distribution. If this is not satisfied, the inputs to the generative model G(z) may no longer match the inputs it has seen during training. This could result in undefined behavior and may not make use of what the generator has learned. It is noted that the density of a high-dimensional Gaussian distribution will condense around the surface of a hyper-sphere (the "Gaussian bubble" effect). By enforcing a hard constraint that z should be near the hyper-sphere, it is more likely that the optimization will find a solution that is consistent with the generative model prior.

The objective in Equation (1) is non-convex, and there are many local solutions for which gradient descent can become stuck. It was found that adding linearly decaying Gaussian noise helped the optimization find better solutions. Table 1 below depicts Algorithm 1, which summarizes the example procedure.

TABLE 1

| Algorithm 1 Inference by Inverting the Generative Model |
|---|

Figure 6:
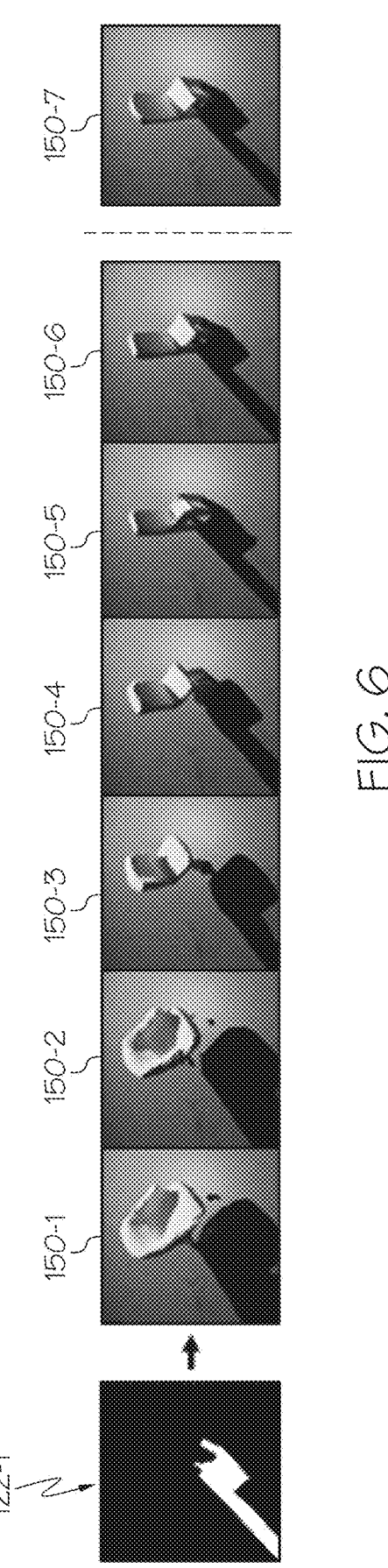
FIG. 6 illustrates digital images of an observed shadow, a plurality of candidate objects generated by a generative model, and an occluded object according to one or more embodiments described and illustrated herein.

1: Input: Shadow image s, step size $\eta$, number of iterations K, and generator G.
2: Output: Parameters of a 3D volume $\Omega$
3: Inference:
4: Randomly initialize $z \sim \mathcal{N}(0, I)$
5: for k = 1, ..., K do
6:     $J(z, c, \phi) = \mathcal{L}(s, \pi(c, \mathcal{T}_\phi(G(z))))$
7: 
$$z \leftarrow z - \eta \cdot (\nabla_z J(z, c, \phi) + \mathcal{N}(0, \sigma I)) \text{ where } \sigma = \frac{K - 1 - k}{K}$$
8:     $z \leftarrow z/\|z\|_2$
9:     $c \leftarrow c - \eta \nabla_c J(z, c, \phi)$
10:     $\phi \leftarrow \phi - \eta \nabla_\phi J(z, c, \phi)$
11: end for
12: Return parameters of 3D volume $\Omega = \mathcal{T}_\phi(G(z))$ FIG. 6 illustrates the optimization process by extracting meshes corresponding to several optimization iterations before converging on a selected, predicted object at the end of the process. Shadow 122-1 is used as a constraint for searching. Object 120-1 is the occluded object the system is trying to match, which is unseen by the generative model. Candidate objects 150-1 through 150-6 are examples of sequential iterations of candidate predicted objects outputted by the generative model. In other words, candidate objects 150-1 through 150-6 show the process of searching in the latent space. FIG. 6 shows a clear transition from the first mesh generated from a randomly sampled latent vector resulting in candidate object 150-1, to the last mesh corresponding to candidate object 150-6 that accurately casts a shadow matching the input shadow 122-1.

The systems and methods for determining a shape and pose of an object occluded by an occlusion object described herein can be implemented in any application. As a non-limiting example, the systems and methods may be employed in a robot, such as a home assist robot, a manufacturing robot, a warehouse robot, and the like. For example, a warehouse robot may be programmed to pick up objects and place them at another location. In some instances, an object may be occluded as described above. The robot may use the systems and methods described herein to detect the occluded object so that it may perform the desired manipulation of the occluded object.

Figure 7:
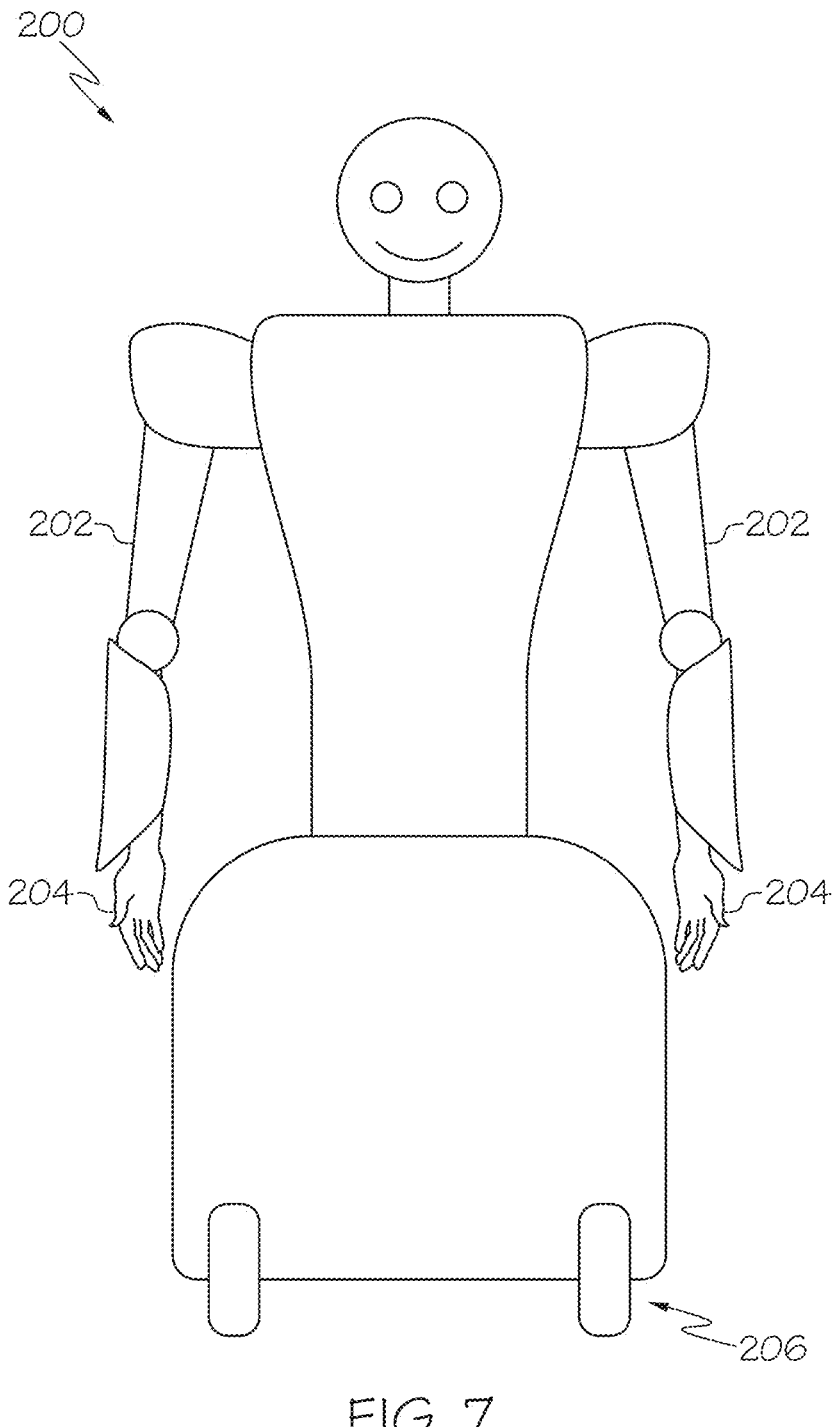
FIG. 7 illustrates an example robot according to one or more embodiments described and illustrated herein.

FIG. 7 illustrates a non-limiting example of a robot 200 capable of determining a shape and pose of an object occluded by an occlusion object. It should be understood that the robot 200 of FIG. 7 is provided for illustrative purposes only, and that embodiments may be utilized in robots having any configuration. The example robot 200 includes arms 202 and end effectors 204 configured as hands. The arms 202 and end effectors 204 may be used to grasp or otherwise manipulate an object, such as an occluded object that is detected by the methods described herein. The example robot further includes a mobility component 206, which in the illustrated embodiment comprises wheels. The mobility component 206 is operable to move the robot 200 throughout an environment.

Applications of the functionalities described herein are not limited to robotic application. For example, the functionalities described herein may be performed by autonomous vehicles. A person or other object that is occluded by a larger object, such as a truck, may be detected by the shadow analysis described herein. As yet another example, video surveillance systems may use the methods described herein to detect occluded objects. Other applications are also possible.

Figure 8:
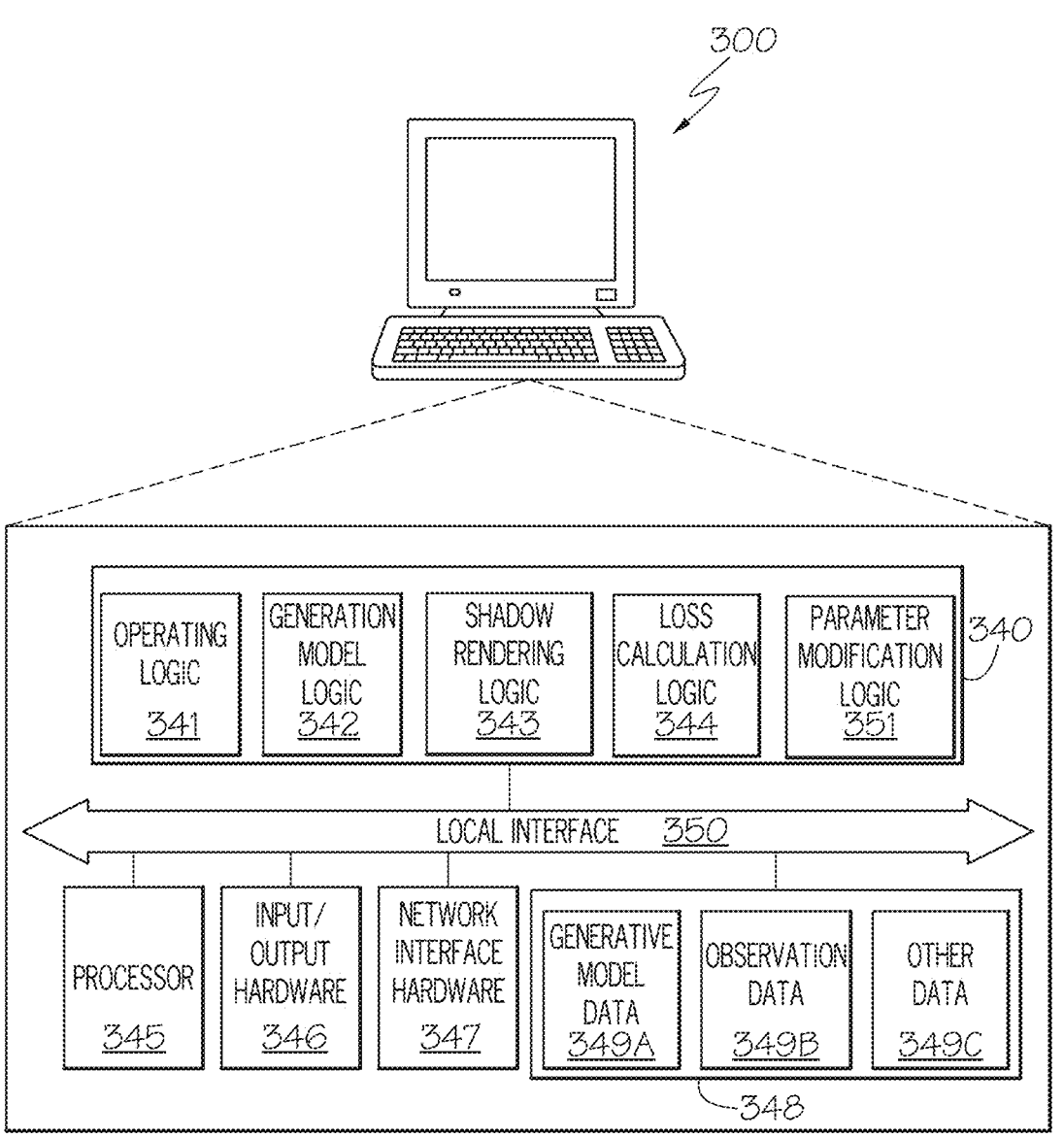
FIG. 8 illustrates an example computing device capable of detecting an occluded object according to one or more embodiments described and illustrated herein.

Embodiments of the present disclosure may be implemented by a computing device, and may be embodied as computer-readable instructions stored on a non-transitory memory device. Referring now to FIG. 8 an example system for determining a shape and pose of an object occluded by an occlusion object configured as a computing device 300 is schematically illustrated. The example computing device 300 provides a system determining a shape and pose of an object occluded by an occlusion object, and/or a non-transitory computer usable medium having computer readable program code for determining a shape and pose of an object occluded by an occlusion object embodied as hardware, software, and/or firmware, according to embodiments shown and described herein. While in some embodiments, the computing device 300 may be configured as a general purpose computer with the requisite hardware, software, and/or firmware, in some embodiments, the computing device 300 may be configured as a special purpose computer designed specifically for performing the functionality described herein. It should be understood that the software, hardware, and/or firmware components depicted in FIG. 8 may also be provided in other computing devices external to the computing device 300 (e.g., data storage devices, remote server computing devices, and the like).

As also illustrated in FIG. 8, the computing device 300 (or other additional computing devices) may include a processor 345, input/output hardware 346, network interface hardware 347, a data storage component 348 (which may include generative model data 349A (i.e., any data needed by generative model 134), observation data 349B (i.e., any data relating to the environment, such as image data of an occluded object), and any other data 349C for performing the functionalities described herein), and a non-transitory memory component 340. The memory component 340 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 340 may be configured to store operating logic 341, generative model logic 342 for generating candidate objects, shadow rendering logic 343 for generating shadows of the candidate objects, loss calculation logic 344 for calculating a loss between the generated shadows and an observed shadow, and parameter modification logic 351 for modifying input parameters to the generative model, such as the latent vector, light location, and pose (each of which may be embodied as computer readable program code, firmware, or hardware, as an example). It should be understood that the data storage component 348 may reside local to and/or remote from the computing device 300, and may be configured to store one or more pieces of data for access by the computing device 300 and/or other components.

A local interface 350 is also included in FIG. 8 and may be implemented as a bus or other interface to facilitate communication among the components of the computing device 300.

The processor 345 may include any processing component configured to receive and execute computer readable code instructions (such as from the data storage component 348 and/or memory component 340). The input/output hardware 346 may include a graphics display device, keyboard, mouse, printer, camera, microphone, speaker, touch-screen, and/or other device for receiving, sending, and/or presenting data. The network interface hardware 347 may include any wired or wireless networking hardware, such as a modem, LAN port, wireless fidelity (Wi-Fi) card, WiMax card, mobile communications hardware, and/or other hardware for communicating with other networks and/or devices.

Included in the memory component 340 may be the store operating logic 341, operating logic 341, generative model logic 342, shadow rendering logic 343, loss calculation logic 344, and parameter modification logic 351. The operating logic 341 may include an operating system and/or other software for managing components of the computing device 300. Similarly, the generative model logic 342 may reside in the memory component 340 and may be configured to generate a plurality of candidate objects over a latent space. The shadow rendering logic 343 also may reside in the memory component 340 and may be configured to render a shadow for each of the candidate objects generated by the generative model logic 342. The loss calculation logic 344 includes logic to calculate a loss between a rendered shadow for a candidate object and an observed shadow. The parameter modification logic 351 is configured to modify one or more of the latent vector, the light location, and pose of an object for the generative model to search a latent space for an ideal candidate object that matches an occluded object.

The components illustrated in FIG. 8 are merely exemplary and are not intended to limit the scope of this disclosure. More specifically, while the components in FIG. 8 are illustrated as residing within the computing device 300, this is a non-limiting example. In some embodiments, one or more of the components may reside external to the computing device 300.

It should now be understood that embodiments of the present disclosure use an observed shadow of an occluded object to detect both the shape and pose of the occluded object without visibly seeing the occluded object. An optimization method iteratively generates candidate objects using a generative model, renders a shadow for each candidate object, and calculates a loss between the rendered shadow and the observed shadow until an ideal candidate object is found (i.e., a candidate object having a loss that is less than a loss threshold).

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method of determining a shape and pose of an object occluded by an occlusion object, the method comprising:
   receiving, by a generative model, a latent vector of an observed shadow of the object occluded by the occlusion object;
   iteratively performing an optimization routine until a loss is less than a loss threshold, the optimization routine comprising:
      generating, by the generative model from the latent vector of the observed shadow of the object occluded by the occlusion object, a predicted object having a shape and a pose;
      generating a predicted shadow cast by the predicted object;
      calculating the loss by comparing the predicted shadow with the observed shadow, wherein the loss corresponds to a generation accuracy of the predicted shadow and the observed shadow;
      modifying the latent vector when the loss is greater than the loss threshold; and
      selecting the predicted object as the object when the loss is less than the loss threshold.

2. The method of claim 1, further comprising receiving a known light location and a known pose of the object, wherein the known light location and the known pose of the object affect the predicted shadow.

3. The method of claim 1, further comprising receiving an initial light location and an initial pose of the object, wherein the optimization routine further comprises modifying the initial light location and the initial pose of the object when the loss is greater than the loss threshold.

4. The method of claim 1, wherein generating the predicted shadow cast by the object is performed by differential shadow rendering.

5. The method of claim 1, wherein the generative model is trained to generate one class of object.

6. The method of claim 1, wherein the loss is a binary cross-entropy loss.

7. A system for determining a shape and pose of an object occluded by an occlusion object, the method comprising:
   one or more processors; and
   a non-transitory, computer-readable medium storing instructions that, when executed by the one or more processors, cause the one or more processors to:
   receive a latent vector of an observed shadow of the object occluded by the occlusion object;
   iteratively perform an optimization routine until a loss is less than a loss threshold, the optimization routine comprising:
      generating, by a generative model from the latent vector of the observed shadow of the object occluded by the occlusion object, a predicted object having a shape and a pose;
      generating a predicted shadow cast by the predicted object;
      calculating the loss by comparing the predicted shadow with the observed shadow, wherein the loss corresponds to a generation accuracy of the predicted shadow and the observed shadow;
      modifying the latent vector when the loss is greater than the loss threshold; and selecting the predicted object as the object when the loss is less than the loss threshold.

8. The system of claim 7, wherein the instructions further cause the one or more processors to receive a known light location and a known pose of the object, wherein the known light location and the known pose of the object affect the predicted shadow.

9. The system of claim 7, wherein the instructions further cause the one or more processors to receive an initial light location and an initial pose of the object, wherein the optimization routine further comprises modifying the initial light location and the initial pose of the object when the loss is greater than the loss threshold.

10. The system of claim 7, wherein generating the predicted shadow cast by the object is performed by differential shadow rendering.

11. The system of claim 7, wherein the generative model is trained to generate one class of object.

12. The system of claim 7, wherein the loss is a binary cross-entropy loss.

13. A robot operable to determine a shape and pose of an object occluded by an occlusion object, the robot comprising:
   one or more processors; and
   a non-transitory, computer-readable medium storing instructions that, when executed by the one or more processors, cause the one or more processors to:
   receive a latent vector of an observed shadow of the object occluded by the occlusion object;
   iteratively perform an optimization routine until a loss is less than a loss threshold, the optimization routine comprising:
      generating, by a generative model from the latent vector of the observed shadow of the object occluded by the occlusion object, a predicted object having a shape and a pose;
      generating a predicted shadow cast by the predicted object;
      calculating the loss by comparing the predicted shadow with the observed shadow, wherein the loss corresponds to a generation accuracy of the predicted shadow and the observed shadow;
      modifying the latent vector when the loss is greater than the loss threshold; and
      select the predicted object as the object when the loss is less than the loss threshold; and
      control a movement of the robot based on the predicted object.

14. The robot of claim 13, wherein the instructions further cause the one or more processors to receive a known light location and a known pose of the object, wherein the known light location and the known pose of the object affect the predicted shadow.

15. The robot of claim 13, wherein the instructions further cause the one or more processors to receive an initial light location and an initial pose of the object, wherein the optimization routine further comprises modifying the initial light location and the initial pose of the object when the loss is greater than the loss threshold.

16. The robot of claim 13, wherein generating the predicted shadow cast by the object is performed by differential shadow rendering.

17. The robot of claim 13, wherein the generative model is trained to generate one class of object.

18. The robot of claim 13, wherein the loss is a binary cross-entropy loss.

19. The robot of claim 13, further comprising an arm and end effector, wherein the movement of the robot comprises moving one or more of the arm and the end effector.

20. The robot of claim 13, further comprising an image sensor, wherein the observed shadow is generated by the image sensor.

* * * * *